US010031807B2

(12) United States Patent
Li et al.

(10) Patent No.: US 10,031,807 B2
(45) Date of Patent: Jul. 24, 2018

(54) CONCURRENT DATA RETRIEVAL IN NETWORKED ENVIRONMENTS

(71) Applicant: INTERNATIONAL BUSINESS MACHINES CORPORATION, Armonk, NY (US)

(72) Inventors: Chao Guang Li, Shanghai (CN); JiaYang Zheng, Shanghai (CN); GuoFeng Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/932,362

(22) Filed: Nov. 4, 2015

(65) Prior Publication Data

US 2017/0123914 A1 May 4, 2017

(51) Int. Cl.
G06F 11/00 (2006.01)
G06F 11/10 (2006.01)
G06F 3/06 (2006.01)

(52) U.S. Cl.
CPC ......... *G06F 11/1088* (2013.01); *G06F 3/064* (2013.01); *G06F 3/067* (2013.01); *G06F 3/0619* (2013.01)

(58) Field of Classification Search
CPC .................................................. G06F 11/1088
See application file for complete search history.

(56) References Cited

U.S. PATENT DOCUMENTS

| 9,137,250 B2 | 9/2015 | Lesavich et al. |
| 2013/0212422 A1 | 8/2013 | Bauer et al. |
| 2015/0222705 A1* | 8/2015 | Stephens ............... G06F 3/0611 709/214 |
| 2016/0261683 A1 | 9/2016 | Ferris |

FOREIGN PATENT DOCUMENTS

CN 103761171 A 4/2014

OTHER PUBLICATIONS

US 9,727,559, 08/2017, Patiejunas et al. (withdrawn)
Khan et al., "Rethinking Erasure Codes for Cloud File Systems: Minimizing I/O for Recovery and Degraded Reads", Fast'12 Proceedings of the 10th USENIX conference on File and Storage Technologies USENIX Association Berkeley, CA, USA © 2012.
Rashmi et al., "A "Hitchhiker's" Guide to Fast and Efficient Data Reconstruction in Erasure-coded Data Centers", SIGCOMM'14, Aug. 17-22, 2014, Chicago, USA, Copyright 2014 ACM.
Zhu et al., "On the Speedup of Recovery in Large-Scale Erasure-Coded Storage Systems", IEEE Transactions on Parallel and Distributed Systems, vol. 25, No. 7, Jul. 2014, pp. 1830-1840.

* cited by examiner

*Primary Examiner* — Bryce Bonzo
*Assistant Examiner* — Katherine Lin
(74) *Attorney, Agent, or Firm* — Gilbert Harmon, Jr.

(57) ABSTRACT

Embodiments of the present invention provide methods, systems, and program products for concurrent data retrieval from multiple loud storage devices. Embodiments of the present invention can be used to retrieve stripes of target data from at least a first network device, retrieve redundancy data of the target data from a second network storage device that is different from the first network storage device concurrently and reconstructing the target data based on the stripes of the target data and the redundancy data.

14 Claims, 7 Drawing Sheets

CONCURRENT DATA RETRIEVAL IN NETWORKED ENVIRONMENTS

BACKGROUND

The present invention relates generally to the field of cloud computing, and more particularly to concurrent data retrieval in cloud computing environments.

Cloud computing is a model for enabling ubiquitous network access to a shared pool of configurable computing and storage resources. Cloud computing and storage rely on sharing of resources to provide end users and enterprises with various capabilities to store and process their data in third-party data centers, thereby achieving coherence and economies of scale. Cloud storage is reliable and cheap and has become increasingly popular. One of the important usages of cloud storage data backup. Typically, end users or enterprises can store their data in the cloud storage. In particular, enterprises often store, backup, and/or archive to multiple cloud storage devices in order to avoid single point of failure (SPOF) issues. In an event of a system failure, the data can be recovered from the cloud. In general, it is required that the backup data is read from the cloud within a limited time window.

SUMMARY

Embodiments of the present invention provide methods, computer systems, and computer program products for allowing concurrent data retrieval from multiple storage devices. In one embodiment of the present invention, a method is provided comprising: retrieving, at a client, stripes of target data from at least a first network storage device; retrieving, at the client, redundancy data of the target data from a second network storage device that is different from the first network storage device, wherein the stripes of the target data and the redundancy data are retrieved concurrently; and reconstructing, at the client, the target data based on the stripes of the target data and the redundancy data.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Embodiments of the present invention recognize that retrieving data from the cloud can be time consuming. In some instances, data recovery cannot be completed within the limited window provided. Embodiments of the present invention provide solutions for allowing concurrent data retrieval from multiple could storage devices. In this manner, as discussed in greater detail in this specification, embodiments of the present invention can be used to read redundant data concurrently to initiate data construction before a failure to retrieve primary data.

The present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
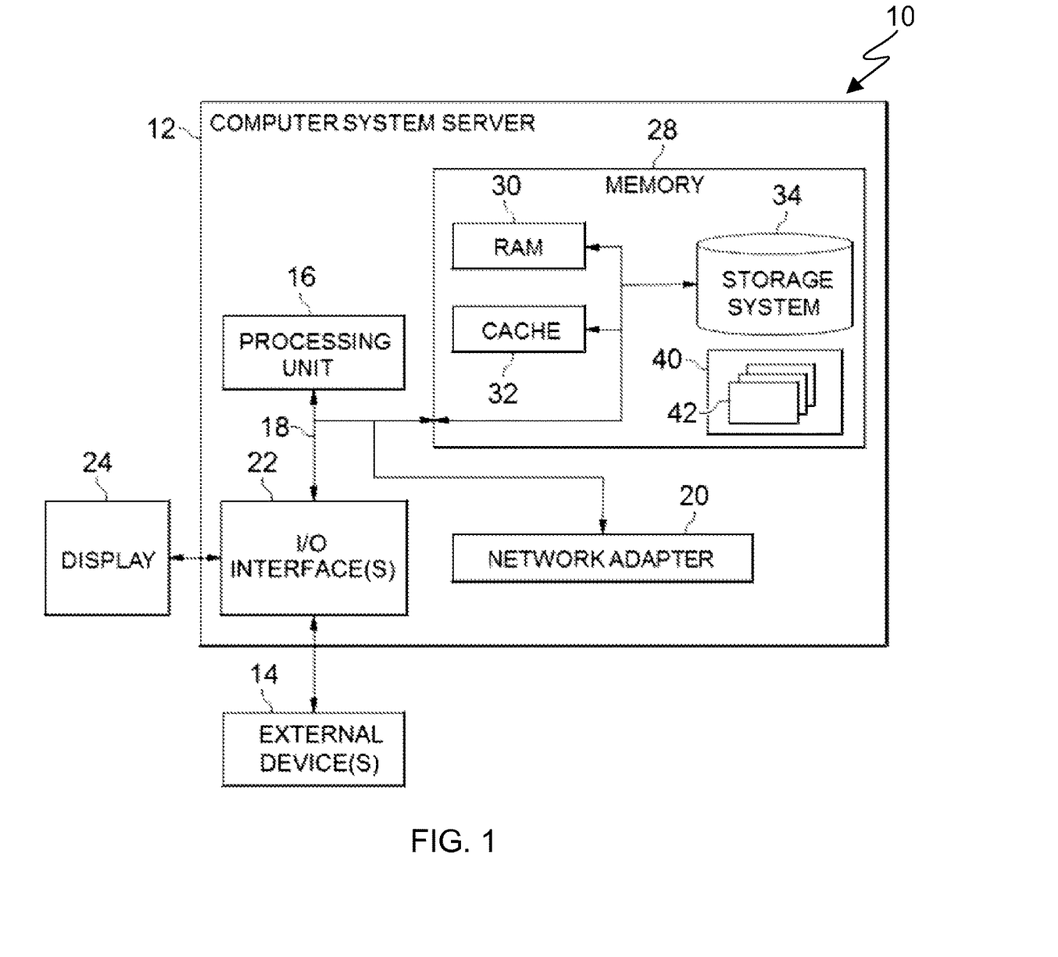
FIG. 1 is a block diagram of an electronic device suitable for implementing embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
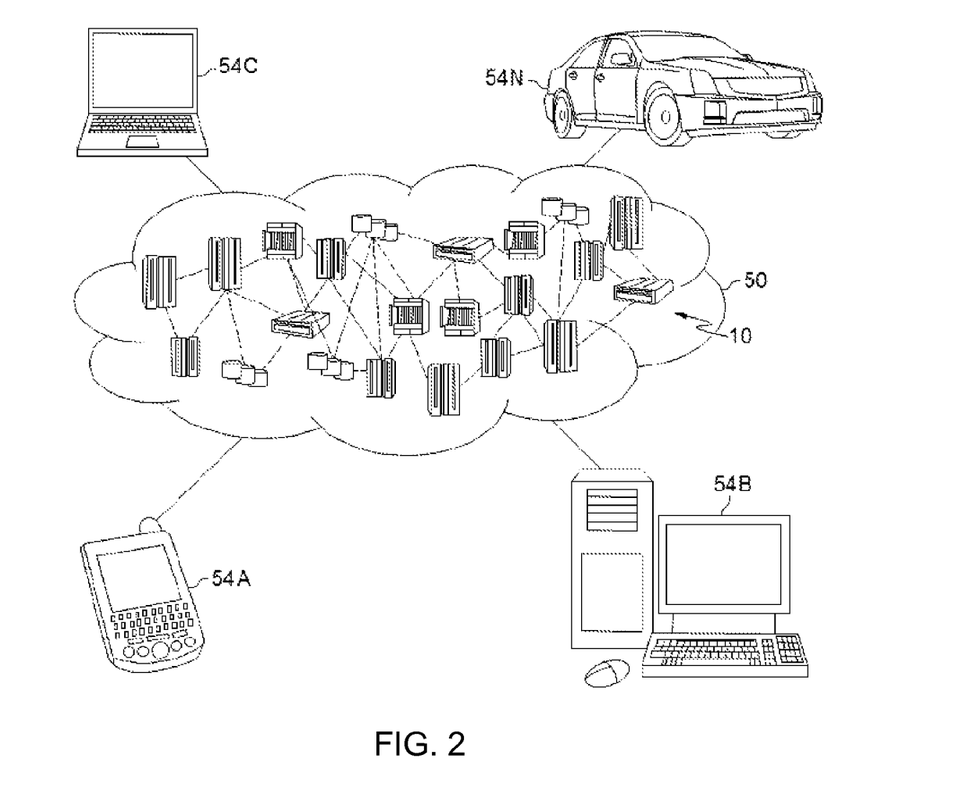
FIG. 2 is a block diagram of a cloud computing environment, in accordance with embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 3:
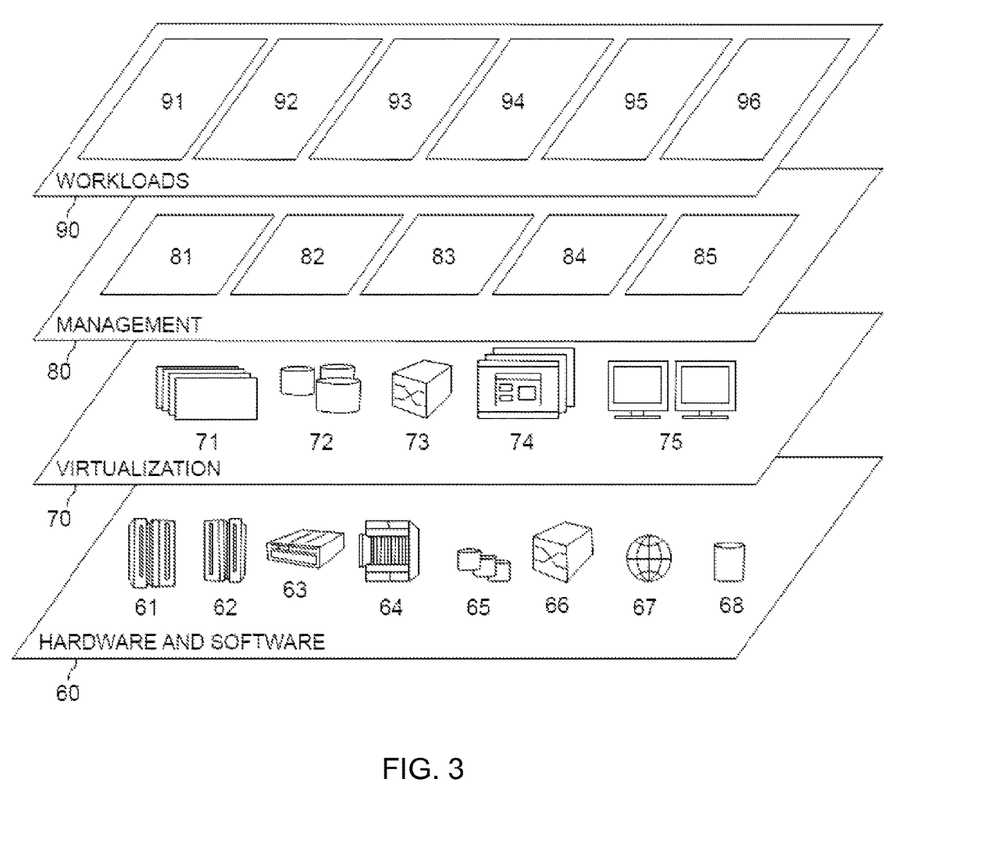
FIG. 3 is a block diagram of abstraction model layers, in accordance with embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96. Some example embodiments of the present invention will be described in the following paragraphs. As described above, when retrieving data from cloud, for example, after a disaster at the data center, it is desired that the data can be retrieved and recovered/reconstructed within a specified time limit. However, the cloud is relatively slow. The input/output (I/O) latency from cloud storage is now large. Moreover, a cloud storage device is usually shared by multiple clients that are connected to the cloud via network such as the Internet Protocol (IP) network. As a result, the I/O performance of the cloud storage devices is unstable and unpredictable. Additionally, in conventional data recovery, the data is always read sequentially from a primary cloud device. Redundancy data will not read until a drive/cloud fails.

In order to improve the efficiency of the data retrieval from cloud, embodiments of the present invention allow concurrent retrieval from multiple cloud storage devices. Instead of waiting for a failure in retrieval of the primary data, redundant data will be read concurrently. In this way, it is possible to initiate the data construction before all the data stripes arrive.

Figure 4:
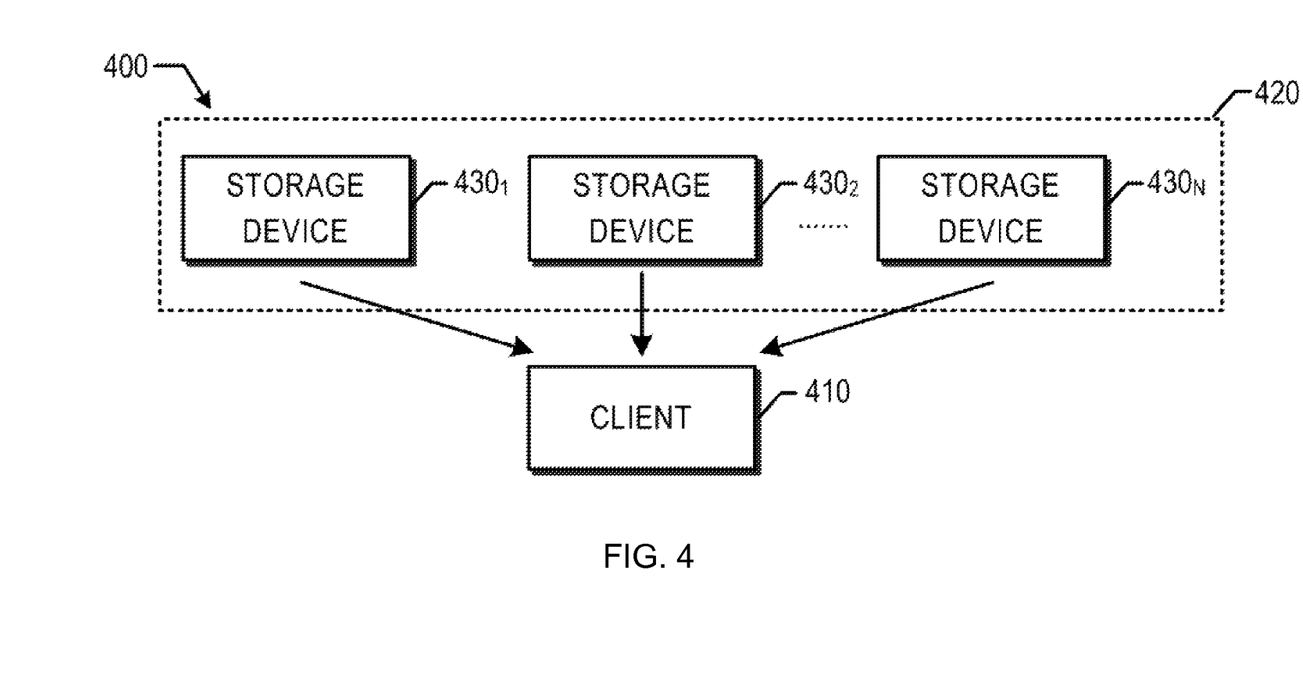
FIG. 4 is a block diagram of a cloud storage system, in accordance with embodiments of the present invention.

FIG. 4 shows a block diagram of a cloud storage system, in accordance with embodiments of the present invention. The cloud storage system 400 includes a client 410 that communicates with the devices in the cloud 420. In one embodiment, the client 410 may be a data center, for example. Alternatively, or in addition, the client 410 may be any device operated by an end user or enterprise. The cloud 420, among other things, includes a plurality of network storage devices $430_1, 430_2 \ldots 430_N$ which are collectively referred to as network storage devices 430. The client 410 and the network storage devices 430 may communicate via any suitable wired and/or wireless connections, including, but not limited to, IP network such as the Internet, local area network (LAN), and the like.

In accordance with embodiments of the present invention, the client 410 stores the same data onto the network storage devices 430. In some embodiments, the data is stored on the network storage devices 430 according to a partial redundancy scheme. Examples of the partial redundancy scheme include, but are not limited to, RAID (Redundant Arrays of Independent Disks) 5, RAID 6, or the like. According to the partial redundancy scheme, the target data may be striped and stored on multiple network storage devices 430 and the parity data may be stored on a dedicated network storage device of the network storage devices 430. Alternatively, in other embodiments, storage of data on the network storage devices 430 may conform to a full redundancy scheme. Examples of the full redundancy scheme include, but are not limited to, RAID 1, RAID 10, or the like. According to the full redundancy scheme, the target data is striped and stored on multiple network storage devices of the network storage devices 430. The parity data will not be stored on a dedicated network storage device 430.

Figure 5:
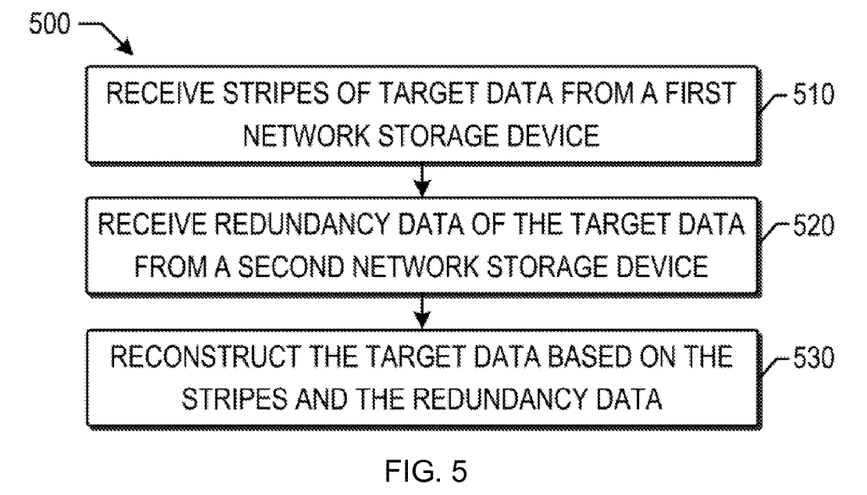
FIG. 5 is a flowchart of a method for concurrent data retrieval from cloud storage systems, in accordance with embodiments of the present invention.

FIG. 5 shows a flowchart of a method for concurrent data retrieval from cloud storage systems, in accordance with embodiments of the present invention. The method 500 will be described with reference to the cloud storage system 400 as shown in FIG. 4. In this embodiment, the target data is concurrently retrieved from multiple network storage devices of the network storage devices 430 which differs from conventional solutions where the target data is sequentially read from a primary network storage device.

In step 510, the client 410 retrieves stripes of the target data from at least a first network storage device, for example, the network storage device $430_1$. As used herein, the term "stripe" refers a data block of a certain size. Concurrently, in step 520, the client 410 retrieves redundancy data of the target data from a second network storage device $430_2$ that is different from the first network storage device $430_1$. That is, rather than reading the primary data sequentially from a single network storage device of the network storage devices 430, the stripes of target data and the redundancy data are retrieved from multiple network storage devices (e.g., $430_1$ and $430_2$), in parallel. More particularly, instead of waiting for completion of the previous data transmission, transmissions of the data stripes in step 510 and the redundancy data in step 520 can be at least partially overlapped with each other.

In some embodiments, the target data is stored according to the partial redundancy scheme, as described above. In those embodiments, in step 520, the redundancy data retrieved from the second network storage device $430_2$ is the parity data of the target data. That is, the second network storage device $430_2$ is the one that stores the parity data of the target data to be retrieved. In addition, depending on the factors such as the communication bandwidth and the I/O performance, it is possible to retrieve other stripes of the target data from one or more other network storage devices of the network storage devices 430, which will be discussed in the following paragraphs.

Alternatively, in other embodiments, the target data is distributed among the network storage devices 430 to conform to full redundancy scheme. In such embodiments, the redundancy data retrieved in step 520 is another set of stripes of the target data that is stored on the second network storage device $430_2$. Moreover, similar to the partial redundancy, it is possible to read further stripes of the target data from one or more other network storage device of the network storage devices 430, which will be discussed in the following paragraphs.

The method 500 then proceeds to step 530, where the target data is reconstructed based on the stripes retrieved in step 510 and the redundancy data retrieved in step 520. For partial redundancy scheme, the target data can be constructed when the redundancy data arrives and enough but not all of the data stripes are available. That is, if the parity arrives earlier than the normal data stripes, it is possible to initiate the process of data reconstruction without waiting for further stripes. For full redundancy scheme, the data reconstruction can be done more quickly because the concurrent transmission of data stripes is faster than sequential transmission from a single cloud storage device.

Figure 6:
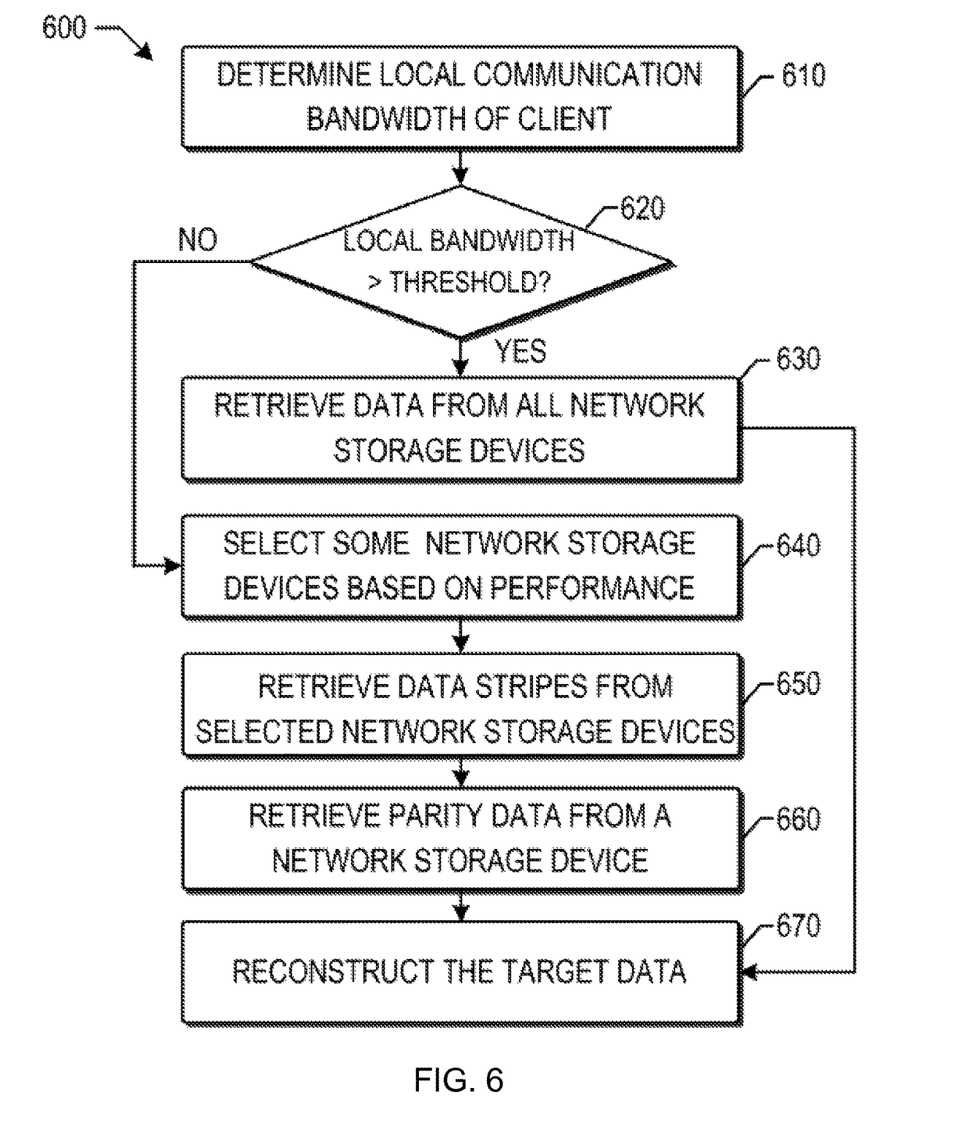
FIG. 6 is a flowchart of a method for concurrent retrieval of data that is stored according to a partial redundancy scheme, in accordance with embodiments of the present invention.

Now some example implementations of the present invention will be described. FIG. 6 shows a flowchart of a method 600 for concurrent retrieval of data that is stored according to a partial redundancy scheme, in accordance with an embodiment of the present invention. In step 610, the local communication bandwidth of the client 410 is determined. The communication bandwidth can be measured, for example, in bit rates per second of the client 410. Then in step 620, it is determined whether the local communication bandwidth of the client 410 exceeds a threshold bandwidth. In some embodiments, the threshold bandwidth may be set to the sum of all the network storage devices 430 that store the target data. In other embodiments, other threshold bandwidth can be used as well.

If the local communication bandwidth of the client 410 exceeds the threshold bandwidth, the method 600 proceeds to step 630, where the client 410 may read the target data from all the network storage devices 430 that store the target data. It would be appreciated that both the stripes and parity data of the target data will be retrieved in step 630. Then the method proceeds to step 670 which will be discussed in the following paragraphs.

Otherwise, if it is determined in step 620 that the local communication bandwidth of the client 410 is below the threshold bandwidth, the method 600 proceeds to step 640, where one or more network storage devices of the network storage devices 430 are selected based on the performance of the network storage devices 430. For example, in some embodiments, the performance of a network storage device 430 may be measured by communication bandwidth, I/O latency, buffer capacity, and the like. One or more network storage devices of the network storage devices 430 with poor performance may be excluded and the data retrieval request may be dynamically dispatched to the network storage device(s) 430 according to the performance.

Next, in step 650, the stripes of the target data are retrieved from the one or more network storage devices of the network storage devices 430 selected in step 640. Concurrently, in step 660, the parity data of the target data is retrieved from a network storage device. In some cases, it is presumed that the first network storage device $430_1$ has the best performance and the second network storage device $430_2$ stores the parity data. As such, the data stripes will be read from the first network storage device $430_1$ in step 650, and the parity data will be read from the second network storage device $430_2$ in step 660. If the local communication bandwidth of the client is high enough, in step 640, stripes of the target data can be further read from one or more other network storage devices of the network storage devices 430

(e.g., network storage device $430_3$, $430_4$, $430_5$, etc.) that are different from the first and second network storage devices $430_1$ and $430_2$.

In step 670, the target data is reconstructed. In accordance with embodiments of the present invention, it is unnecessary to wait for all the stripes of the target data. Instead, once enough stripes are received and the parity data arrives, the client 410 is able to initiate the data reconstruction. In this way, the efficiency of the data reconstruction can be improved.

Figure 7:
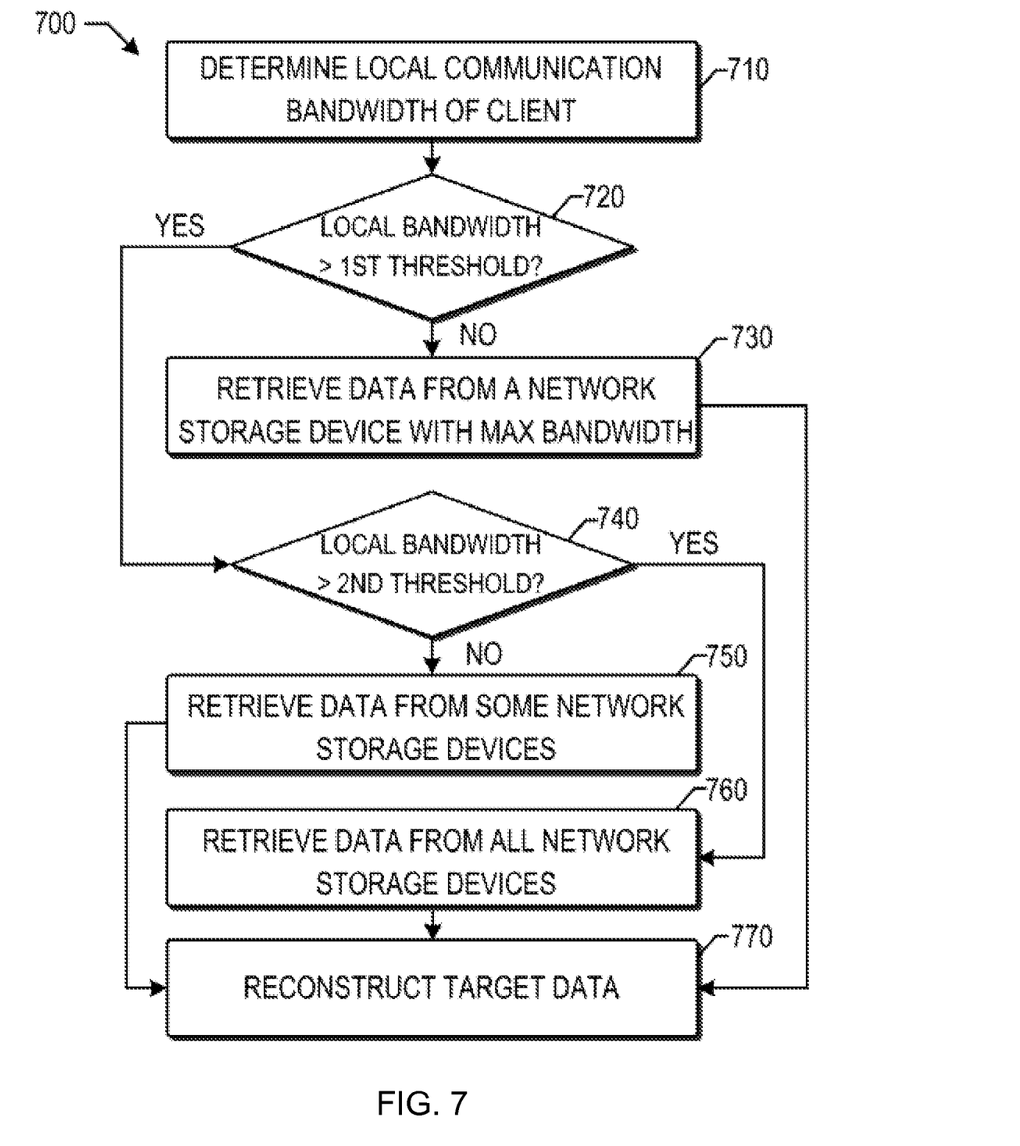
FIG. 7 is a flowchart of a method for concurrent retrieval of data that is stored according to a full redundancy scheme, in accordance with embodiments of the present invention.

FIG. 7 shows a flowchart of a method 700 for concurrent retrieval of data that is stored according to a full redundancy scheme, in accordance with an embodiment of the present invention. In step 710, the local communication bandwidth of the client 410 is determined. Then in step 720, the local communication bandwidth of the client 410 is compared with a first threshold bandwidth to determine whether the local communication bandwidth is greater than the first threshold. In some embodiments, the first threshold bandwidth may be set to the maximum of the communication bandwidths of the network storage devices 430. In other embodiments, the first threshold bandwidth can be set to other values as well.

If it is determined in step 720 that the local communication bandwidth is below the first threshold bandwidth, in some embodiments, the method 700 proceeds to step 730, where the client 410 retrieves stripes of the target data from a network storage device of the network storage devices 430 with the maximum bandwidth. Then the method 700 proceeds to step 770 to reconstruct the target data. That is, when the local communication bandwidth of the client 410 is quite low, the data is only read from a single network storage device of the network storage devices 430 without retrieving parity data.

If it is determined in step 720 that the local communication bandwidth exceeds the first threshold bandwidth, the method 700 proceeds to step 740. In step 740, it is determined whether the local communication bandwidth of the client 410 exceeds a second threshold bandwidth. In this embodiment, the second threshold bandwidth is greater than the first threshold bandwidth. For example, in some embodiments, the second threshold bandwidth may be set to the sum of the communication bandwidths of all network storage devices 430. Other threshold values are possible as well.

If it is determined in step 740 that the local communication bandwidth of the client 410 is below the second threshold bandwidth (that is, the local communication bandwidth of the client 410 is between the first and second threshold bandwidths), the method 700 proceeds to step 750. In step 750, the stripes of the target data is retrieved from some network storage devices of the network storage devices 430. In some embodiments, these network storage devices 430 may be selected based on the local communication bandwidth of the client 410. For example, in one embodiment, the selection may be done in such a way that the sum of the communication bandwidths of the selected network storage devices of the network storage devices 430 is close enough to the local communication bandwidth of the client 410. For instance, if the total available bandwidth of the first and second network storage devices $430_1$ and $430_2$ is essential the same as the local communication bandwidth of the client 410, then in step 750, the data stripes may be read from the first and second network storage devices $430_1$ and $430_2$.

Otherwise, if it is determined in step 740 that the local communication bandwidth of the client 410 exceeds the second threshold bandwidth, the method 700 proceeds to step 760. In this step, since the local communication bandwidth of the client 410 is high enough, stripes of the target data are retrieved from more network storage devices 430. For example, in one embodiment, the data stripes can be read from all the available network storage devices 430. Next, in step 770, the target data can be efficiently reconstructed.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In general, example embodiments of the present invention provide a method, a device, and a computer program product for concurrent data retrieval in a networked environment.

In an aspect, a method is provided. According to the method, stripes of target data are retrieved at a client at least from a first network storage device. Redundancy data of the target data is retrieved at the client from a second network storage device that is different from the first network storage device. The stripes of the target data and the redundancy data are retrieved concurrently. Then the target data is reconstructed at the client based on the stripes of the target data and the redundancy data.

In another aspect, a device is provided. The device includes a processing unit and a memory coupled to the processing unit and storing instructions thereon. The instructions can be executed by the processing unit to perform acts. The acts include retrieving, at a client, stripes of target data at least from a first network storage device and concurrently retrieving redundancy data of the target data from a second network storage device that is different from the first network storage device. The acts further include reconstructing, at the client, the target data based on the stripes of the target data and the redundancy data.

In yet another aspect, a computer program product is provided. The computer program product is tangibly stored on a non-transient machine-readable medium and comprises machine-executable instructions. When executed on a device, the instructions cause the device to retrieve, at a client, stripes of target data at least from a first network storage device; retrieve, at the client, redundancy data of the target data from a second network storage device that is different from the first network storage device, wherein the stripes of the target data and the redundancy data are retrieved concurrently; and reconstruct, at the client, the target data based on the stripes of the target data and the redundancy data.

What is claimed is:

1. A computer-implemented method for improving the efficiency of the data retrieval from a cloud service, the method comprising:
   retrieving, at a client, stripes of target data from at least a first network storage device;
   retrieving, at the client, redundancy data of the target data from a second network storage device that is different from the first network storage device, wherein the stripes of the target data and the redundancy data are retrieved concurrently, wherein the target data is stored on a plurality of network storage devices according to a partial redundancy scheme, and wherein retrieving the redundancy data comprises retrieving parity data of the target data from the second network storage device;
   in response to a local communication bandwidth of the client being below a threshold bandwidth, selecting, at the client, the first network storage device from among the plurality of network storage devices based on performance of the plurality of network storage devices; and reconstructing, at the client, the target data based on the stripes of the target data and the redundancy data.

2. The method of claim 1, further comprising: in response to a local communication bandwidth of the client exceeding a threshold bandwidth, retrieving stripes of the target data from a third network storage device of the plurality of network storage devices, wherein the third network storage device is different from the first and second network storage devices.

3. The method of claim 1, wherein the target data is stored on a plurality of network storage devices according to a full redundancy scheme, and wherein retrieving the redundancy data comprises retrieving stripes of the target data from the second network storage device.

4. The method of claim 3, further comprising:

in response to a local communication bandwidth of the client being below a threshold bandwidth, selecting the first and second network storage devices from among the plurality of network storage devices based on the local communication bandwidth of the client and performance of the plurality of network storage devices.

5. The method of claim 3, further comprising:

in response to a local communication bandwidth of the client exceeding a threshold bandwidth, retrieving stripes of the target data from a third network storage device of the plurality of network storage devices, wherein the third network storage device is different from the first and second network storage devices.

6. A computer system comprising:

one or more computer processors;

one or more computer readable storage media; and program instructions stored on the one or more computer readable storage media for execution by at least one of the one or more computer processors, the program instructions comprising:

program instructions to retrieve, at a client, stripes of target data from at least a first network storage device;

program instructions to retrieve, at the client, redundancy data of the target data from a second network storage device that is different from the first network storage device, wherein the stripes of the target data and the redundancy data are retrieved concurrently, wherein the target data is stored on a plurality of network storage devices according to a partial redundancy scheme, and wherein retrieving the redundancy data comprises retrieving parity data of the target data from the second network storage device;

in response to a local communication bandwidth of the client being below a threshold bandwidth, program instructions to select the first network storage device from among the plurality of network storage devices based on performance of the plurality of network storage devices; and program instructions to reconstruct, at the client, the target data based on the stripes of the target data and the redundancy data.

7. The computer system of claim 6, wherein the program instructions stored on the one or more computer readable storage media further comprise: program instructions to, in response to a local communication bandwidth of the client exceeding a threshold bandwidth, retrieve stripes of the target data from a third network storage device of the plurality of network storage devices, wherein the third network storage device is different from the first and second network storage devices.

8. The computer system of claim 6, wherein the target data is stored on a plurality of network storage devices according to a full redundancy scheme, and wherein retrieving the redundancy data comprises retrieving stripes of the target data from the second network storage device.

9. The computer system of claim 8, wherein the program instructions stored on the one or more computer readable storage media further comprise:

program instructions to, in response to a local communication bandwidth of the client being below a threshold bandwidth, select the first and second network storage devices from among the plurality of network storage devices based on the local communication bandwidth of the client and performance of the plurality of network storage devices.

10. The computer system of claim 8 wherein the program instructions stored on the one or more computer readable storage media further comprise:

program instructions to, in response to a local communication bandwidth of the client exceeding a threshold bandwidth, retrieve stripes of the target data from a third network storage device of the plurality of network storage devices, wherein the third network storage device is different from the first and second network storage devices.

11. A computer program product comprising:

one or more computer readable storage media and program instructions stored on the one or more computer readable storage media, the program instructions comprising:

program instructions to retrieve, at a client, stripes of target data from at least a first network storage device;

program instructions to retrieve, at the client, redundancy data of the target data from a second network storage device that is different from the first network storage device, wherein the stripes of the target data and the redundancy data are retrieved concurrently, wherein the target data is stored on a plurality of network storage devices according to a partial redundancy scheme, and wherein retrieving the redundancy data comprises retrieving parity data of the target data from the second network storage device;

in response to a local communication bandwidth of the client being below a threshold bandwidth, program instructions to select the first network storage device from among the plurality of network storage devices based on performance of the plurality of network storage devices; and program instructions to reconstruct, at the client, the target data based on the stripes of the target data and the redundancy data.

12. The computer program product of claim 11, wherein the program instructions stored on the one or more computer readable storage media further comprise: program instructions to, in response to a local communication bandwidth of the client exceeding a threshold bandwidth, retrieve stripes of the target data from a third network storage device of the plurality of network storage devices, wherein the third network storage device is different from the first and second network storage devices.

13. The computer program product of claim 11, wherein the target data is stored on a plurality of network storage devices according to a full redundancy scheme, and
    wherein retrieving the redundancy data comprises retrieving stripes of the target data from the second network storage device.

14. The computer program product of claim 13, wherein the program instructions stored on the one or more computer readable storage media further comprise:
    program instructions to, in response to a local communication bandwidth of the client being below a threshold bandwidth, select the first and second network storage devices from among the plurality of network storage devices based on the local communication bandwidth of the client and performance of the plurality of network storage devices.

\* \* \* \* \*